(12) United States Patent
Kim et al.

(10) Patent No.: US 8,805,923 B2
(45) Date of Patent: Aug. 12, 2014

(54) METHOD FOR UPDATING CONTENTS OF A DMS IN A DLNA SYSTEM

(75) Inventors: Chul-seung Kim, Seoul (KR); Ho-Chul Shin, Seongnam-si (KR); Woo-Jun Choi, Suwon-si (KR); Seung-Mi Kang, Yongin-si (KR); Young-Kyu Bae, Suwon-si (KR); Young-Seop Han, Suwon-si (KR); Yun-Je Oh, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 2088 days.

(21) Appl. No.: 11/497,835

(22) Filed: Aug. 2, 2006

(65) Prior Publication Data

US 2007/0130308 A1 Jun. 7, 2007

(30) Foreign Application Priority Data

Dec. 5, 2005 (KR) .......................... 10-2005-0117722

(51) Int. Cl.
*G06F 15/16* (2006.01)
(52) U.S. Cl.
USPC ............................ 709/203; 709/219; 709/227
(58) Field of Classification Search
CPC .......... G06F 11/1443; G06F 17/30067; G06F 17/30174; G06F 17/30575; G06F 17/30; H04L 29/06; H04L 29/2854; H04L 67/02; H04L 67/1095; H04L 67/325; H04L 69/329

USPC ........................................................ 709/203
See application file for complete search history.

(56) References Cited

U.S. PATENT DOCUMENTS

| | | | |
|---|---|---|---|
| 6,449,734 B1 * | 9/2002 | Shrivastava et al. | 714/15 |
| 6,499,117 B1 * | 12/2002 | Tanaka | 714/49 |
| 6,877,037 B1 * | 4/2005 | Adachi | 709/227 |
| 6,938,079 B1 * | 8/2005 | Anderson et al. | 709/222 |
| 7,606,837 B2 * | 10/2009 | Shields et al. | 1/1 |
| 7,698,297 B2 * | 4/2010 | Jawa et al. | 707/713 |
| 2002/0122070 A1 * | 9/2002 | Watanabe | 345/810 |
| 2002/0161890 A1 * | 10/2002 | Chen | 709/226 |
| 2003/0055996 A1 * | 3/2003 | Mori et al. | 709/232 |
| 2006/0184972 A1 * | 8/2006 | Rafey et al. | 725/80 |

* cited by examiner

*Primary Examiner* — Christopher Biagini
(74) *Attorney, Agent, or Firm* — Cha & Reiter, LLC.

(57) ABSTRACT

A method for updating contents of a Digital Media Server (DMS) in a digital living network alliance system (DLNA) is disclosed. An update process is performed through a periodic update event in a Digital Media Player (DMP) that receives all content information of the DMS. Upon determining that information loss has occurred in the update process, the DMP sends to the DMS a request for information about a list of items possessed by the DMS. The DMP receives the requested information about the list of items and compares the received information about the list of items with information about pre-stored items to obtain a comparison result. When a difference occurs as the comparison result, all information about contents of the DMS is obtained through a browse action. When the difference does not occur as the comparison result, the update process is continuously performed.

16 Claims, 5 Drawing Sheets

METHOD FOR UPDATING CONTENTS OF A DMS IN A DLNA SYSTEM

CLAIM OF PRIORITY

This application claims priority under 35 U.S.C. §119 to an application entitled "Method for Updating Contents of a DMS in a DLNA System," filed in the Korean Intellectual Property Office on Dec. 5, 2005 and assigned Serial No. 2005-117722, the contents of which are incorporated herein by reference in their entirety.

BACKGROUND OF THE INVENTION

1. Field of the Invention

The present invention generally relates to a Digital Living Network Alliance (DLNA) system, and more particularly to a method for identifying content update information sent between a Digital Media Player (DMP) and a Digital Media Server (DMS).

2. Description of the Related Art

Home network technology provides a future-oriented home environment in which anyone can receive various high-quality home services when all information appliances in the home are connected to a wired/wireless network, irrespective of place and time. Because this home network technology is regarded as the underlying enabling technology of an ubiquitous environment and is the key technology, research is on-going into ways to improve performance while maintaining quality and scope of services.

One organization whose objectives include improving home network technology is the Digital Living Network Alliance (DLNA), a standardization organization for home network technology. The DLNA solves compatibility problems encountered in commercializing home network products by serving as a standardization organization. The DLNA was created as a result of efforts of an existing Digital Home Working Group (DHWG) created by Microsoft, IBM, HP, Intel, Sony, Matsushita, Samsung Electronics, and others on Jun. 2003. Digital Living Network Alliance and DLNA are registered trademarks of the Digital Living Network Alliance.

The DLNA defines a Personal Computer (PC) Internet network (of a PC, printer, etc.), a mobile network (of a Personal Digital Assistant (PDA), mobile phone, notebook computer, etc.), and an appliance network (of a Television (TV), audio, Digital Video Disc (DVD) player, etc.) as networks coexisting in the home. Moreover, the DLNA has attempted to provide interoperability through three schemes based on cooperation between leading industrial companies, standardization of an interoperability framework, products conforming thereto, and so on.

Specifically, the technology considered by the DLNA is to obtain, transmit, and manage a plurality of digital media contents (e.g., images, music, video, etc.) from personal devices such as mobile devices, PCs, etc. for consumers. That is, the DLNA technology allows media contents to be conveniently enjoyed on a home device, irrespective of the position and the type of device in the home.

For this, the DLNA is developing standards for physical media, network transmission, media formats, streaming protocols, Digital Right Management (DRM), among others on the basis of Universal Plug and Play (UPnP) technology.

Next, the DLNA will be described in detail. First, a network connection in the DLNA is based on Internet Protocol (IP). The IP is the basic network communication protocol for a device operating on the Internet. Through the IP, information can be transparently exchanged by instances of an application program executing on various media.

For example, a PC or Set-Top Box (STB) can wirelessly transmit media contents to a TV of the home through an Institute of Electrical and Electronics Engineers (IEEE) 802.11 Access Point (AP) connected to an Ethernet cable. Accordingly, all DLNA devices can communicate with other devices connected to the Internet through the IP, anywhere in the world.

A physical layer of the DLNA uses at least one of a wired high-speed Ethernet (802.11u) and a wireless Ethernet (802.11a/b/g). The stability of the wired Ethernet has been already verified. The wireless Ethernet has adopted Wi-Fi according to an increase of wireless home network communication.

The technology for discovering and controlling a device within a DLNA network is based on the existing UPnP Audio Video (AV) architecture and the existing UPnP device architecture to automatically configure networking setup for an IP address and identify and manage other devices. Similarly, the technology for discovering and controlling a service within a DLNA network is also based on the existing UPnP AV architecture and the existing UPnP device architecture.

In the above-described DLNA, device classes are divided into a Digital Media Server (DMS) and a Digital Media Player (DMP). The DMS performs a function of a server for providing media in the UPnP AV spec, and the DMP performs functions of a Media Renderer Device (MRD) and a Media Renderer Control Point (MRCP), i.e., functions for selecting, controlling, and playing media.

Figure 1:
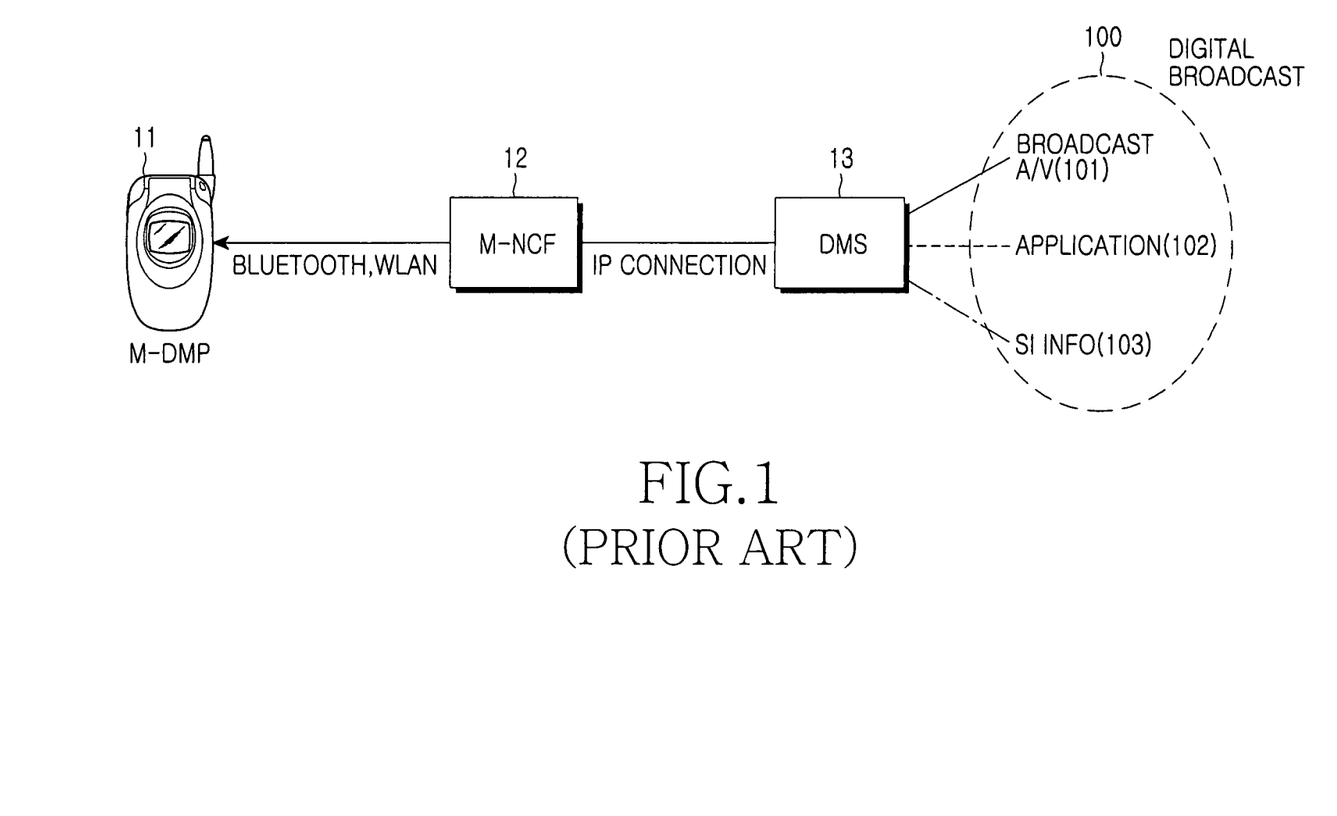
FIG. 1 illustrates an example of a conventional Digital Living Network Alliance (DLNA) system to which the present invention is applied.

FIG. 1 illustrates an example of a conventional DLNA system to which the present invention is applied.

As illustrated in FIG. 1, the DLNA system is configured on the basis of a DMS 13 for providing multimedia contents and a Mobile DMP (M-DMP) 11 for executing the provided multimedia contents. The M-DMP 11 conventionally includes wired and wireless DMPs. The M-DMP 11 of the present invention is preferably wireless, but the present invention includes a wired DMP. A Mobile-Network Connection Function (M-NCF) entity 12 used as an intermediate node for coupling the DMP 11 and the M-DMS 13.

In this DLNA system, content update information of the DMS is obtained through a periodic update process after the DMP receives all initial information.

This process will be described with reference to FIG. 2.

Figure 2:
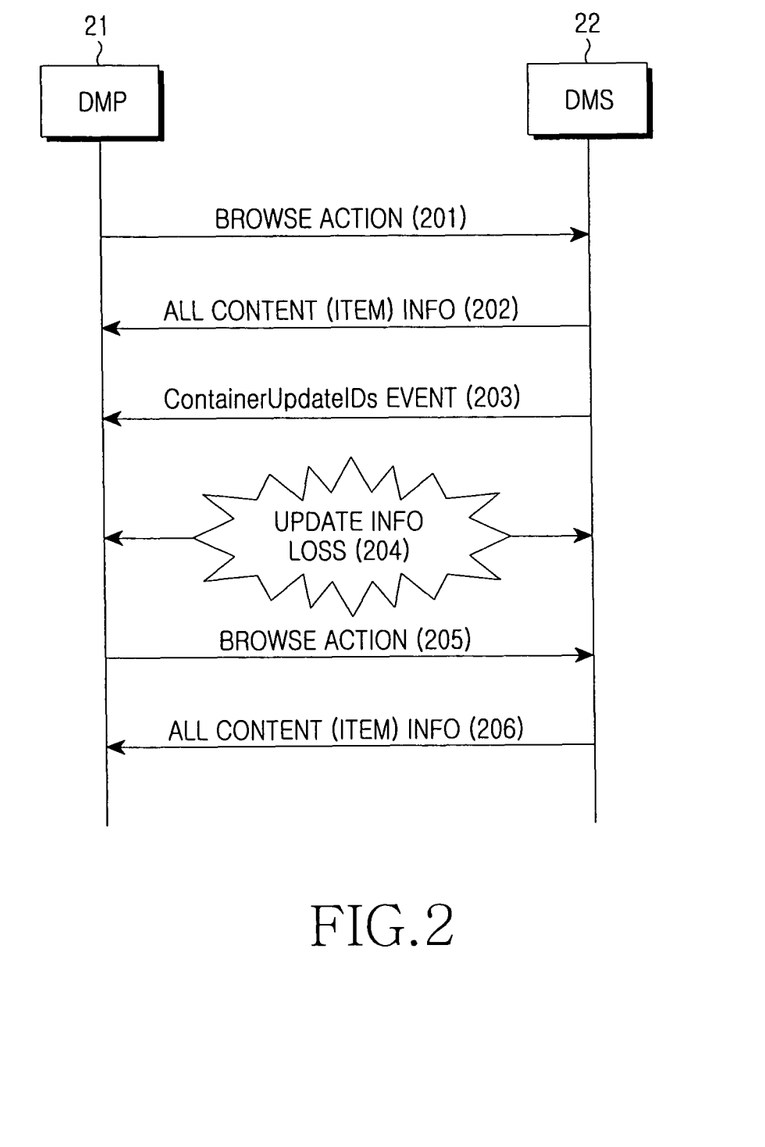
FIG. 2 illustrates a flowchart illustrating an example of a process for updating contents of a Digital Media Server (DMS) in the conventional DLNA system.

FIG. 2 is a flowchart illustrating an example of a process for updating contents of the DMS in a conventional DLNA system.

Referring to FIG. 2, a DMP 21 obtains all information about contents of the DMS 22 through a browse action thereto (Steps 201 and 202).

Through this browse action, a content (or item) list of the DMS 22 is received in Extensible Markup Language (XML) format. Information received in the XML format includes each content Identifier (ID), item tree-related information such as a parent ID, child count, content title, content class, and content size mapped to the associated content, and detailed information about contents.

The update of content information received from the DMS 22 through the browse action is identified in a "ContainerUpdateIDs" event of a "ContentDirectory" (Step 203). In the "ContainerUpdateIDs" event, information about changed items is transferred in a regular period. However, the basic environment of the DLNA system is based on the IP. Because a sequential packet transmission may not be guaranteed according to the variable traffic of a network environment, a reliability problem occurs in the "ContainerUpdateIDs" event when only a pard if ab updated item is received by the DMS 22.

When an associated event is lost in the "ContainerUpdateIDs" event of the current DLNA content directory spec, information about contents (or items) may differ between the DMS 22 and the DMP 21, i.e., it may be wrong.

When accessing the DMS 22 using this wrong item information, the DMP 21 must wait for a predetermined time because an item cannot be searched for. When the DMP 21 accesses a different item and wrong information or contents, a problem in the associated DMP 21 service occurs. The "ContainerUpdateIDs" event is not an event to be transferred at every update time, but is an event to be transferred periodically. When a content update of the DMS 22 is not transferred in real time, synchronization may not be acquired when the DMP 21 uses a content list.

When update information is lost (Step 204), the conventional DMP 21 obtains all information about contents of the DMS 22 using the browse action (Steps 205 and 206).

When the amount of information lost about contents (or items) of the DMS 22 is small, a special problem does not occur. However, if the amount of information lost about contents (or items) is large as in a computer, significant overhead occurs when all information about contents is fetched by the DMP 21 from the DMS 22 using the browse action. When update information is frequently lost, it significantly affects DNLA system performance.

SUMMARY OF THE INVENTION

Accordingly, the present invention has been designed to solve the above and other problems occurring in the prior art, by providing a method for identifying updated contents of a Digital Media Server (DMS) on a Digital Living Network Alliance (DLNA) authentication network such that information about contents between a Digital Media Player (DMP) and the DMS can be continuously and correctly updated, by defining an action based on a new state variable that obtains a smaller amount of data than a browse action for obtaining detailed information about all items and that can more effectively identify all the items than the conventional "ContainerUpdateIDs" event.

The present invention provides the correct content information by defining a state variable relative to a Digital Media Server (DMS) and receiving content information of the DMS when a Digital Media Player (DMP) needs the information.

In accordance with a first embodiment of the present invention, there is provided a method for updating contents of a Digital Media Server (DMS) in a Digital Living Network Alliance (DLNA) system, comprising the steps of:

a) performing an update process through a periodic update event in a Digital Media Player (DMP) that receives all content information of the DMS;

b) sending a request for information about a list of items possessed by the DMS from the DMP to the DMS, upon determining that information loss has occurred in the performed update process;

c) receiving the requestd information about the list of items and comparing the received information about the list of items with information about pre-stored items to obtain a comparison result;

d) obtaining all information about contents of the DMS through a browse action when a difference occurs as the comparison result of step c); and e) performing to steps a) through e) when the difference does not occur as the comparison result of step c).

In accordance with a second embodiment of the present invention, there is provided a method for updating contents of a Digital Media Server (DMS) in a Digital Living Network Alliance (DLNA) system, comprising the steps of:

a) performing an update process through a periodic update event in a Digital Media Player (DMP) that receives all content information of the DMS;

b) requesting by the DMP information about a list of items possessed to the DMS, upon determining that information loss has occurred in the update process;

c) receiving the requested information about the list of items and comparing the received information about the list of items with information about pre-stored items to obtain a comparison result;

d) requesting contents of a different list of items and obtaining information about the contents of the different list of items from the DMS, when a difference occurs as a comparison result of the step c); and e) performing steps a) through e) when the difference does not occur as the comparison result of the step c).

BRIEF DESCRIPTION OF THE DRAWINGS

The above and other aspects of the present invention will be more clearly understood from the following detailed description taken in conjunction with the accompanying drawings, in which.

DETAILED DESCRIPTION OF THE INVENTION

Exemplary embodiments of the present invention will be described in detail herein below with reference to the accompanying drawings. For the purposes of clarity and simplicity, detailed descriptions of functions and configurations incorporated herein that are well known to those skilled in the art are omitted for clarity and conciseness.

The present invention is a method for identifying and periodically updating contents of a Digital Media Server (DMS) in a Digital Media Player (DMP) of a Digital Living Network Alliance (DLNA) system. The method of the present invention is different from a method for getting updated container Identifiers (IDs) of contents of the DMS using the conventional "ContainerUpdateIDs" event.

That is, the present invention is a new method for identifying update information about contents of the DMS in an Internet Protocol (IP)-based DLNA system, comprising a new "state variable" and a new "Action" relating to "ContentDirectory" of a UPnP Audio Video (AV) stack.

In a first preferred embodiment of the present invention, a DLNA device (e.g., DMS, DMP, etc.) has IP connectivity and includes a Hypertext Transfer Protocol (HTTP) server/client. Moreover, the DLNA device can receive and transmit Universal Plug and Play (UPnP) messages and has one module of a UPnP device or Control Point (CP).

A S/W stack of each device uses an IP-based HTTP Multicast (HTTPMU) (directory), HTTP Unicast (HTTPU) (directory), and HTTP stack, and includes a protocol stack as defined in the UPNP device architecture, a protocol stack as defined in the UPNP forum working committee, and a protocol stack as defined in the UPNP vendor.

In the first preferred embodiment of the present invention, an "ItemTreeList" state variable is used to store a content tree list of the DMS. This "ItemTreeList" state variable includes item IDs within a tree in the Extensible Markup Language (XML) format. This XML is hierarchically stored. Through this, the DMP can identify all tree layers and layer-by-layer IDs.

The "ItemTreeList" state variable is defined in Table 1.

TABLE 1

| Variable Name | Req or Opt | Data Type | Allowed Value | Default Value |
|---|---|---|---|---|
| ItemTreeList | Opt | String | String | — |

A "GetItemTreeList" action is defined as the action for identifying an "ItemTreeList" value.

TABLE 2

| Name | Req or Opt |
|---|---|
| GetItemTreeList | Opt |

Also, a "GetActionFinishedNotify" is defined as follows.

TABLE 3

| Argument(s) | Direction | Type | Description | Related State Variable |
|---|---|---|---|---|
| GetItemTreeList | OUT | String | Transfer ItemTreeList value | ItemTreeList |

Example 1 illustrates the format of an action response used in the conventional DLNA system. When the "GetItemTreeList" action as shown in Table 2 is invoked, content IDs of the DMS are transferred through a response Simple Object Access Protocol (SOAP) message.

EXAMPLE 1

```
HTTP/1.1 200 OK
CONTENT-TYPE: text/xml; charset="utf-8"
<s:Envelope xmlns:s="http://schemas.xmlsoap.org/soap/envelope/"
    s:encodingStyle="http://schemas.xmlsoap.org/soap/encoding/">
  <s:Body>
    <u:GetItemTreeListResponse xmlns:u="urn:schemas-upnp-
org:service:serviceType:v">
      <ItemTreeList>TREE ITEM ID XML FILE </ItemTreeList>
    <u:GetItemTreeListResponse>
  </s:Body>
</s:Envelope>
```

Figure 3:
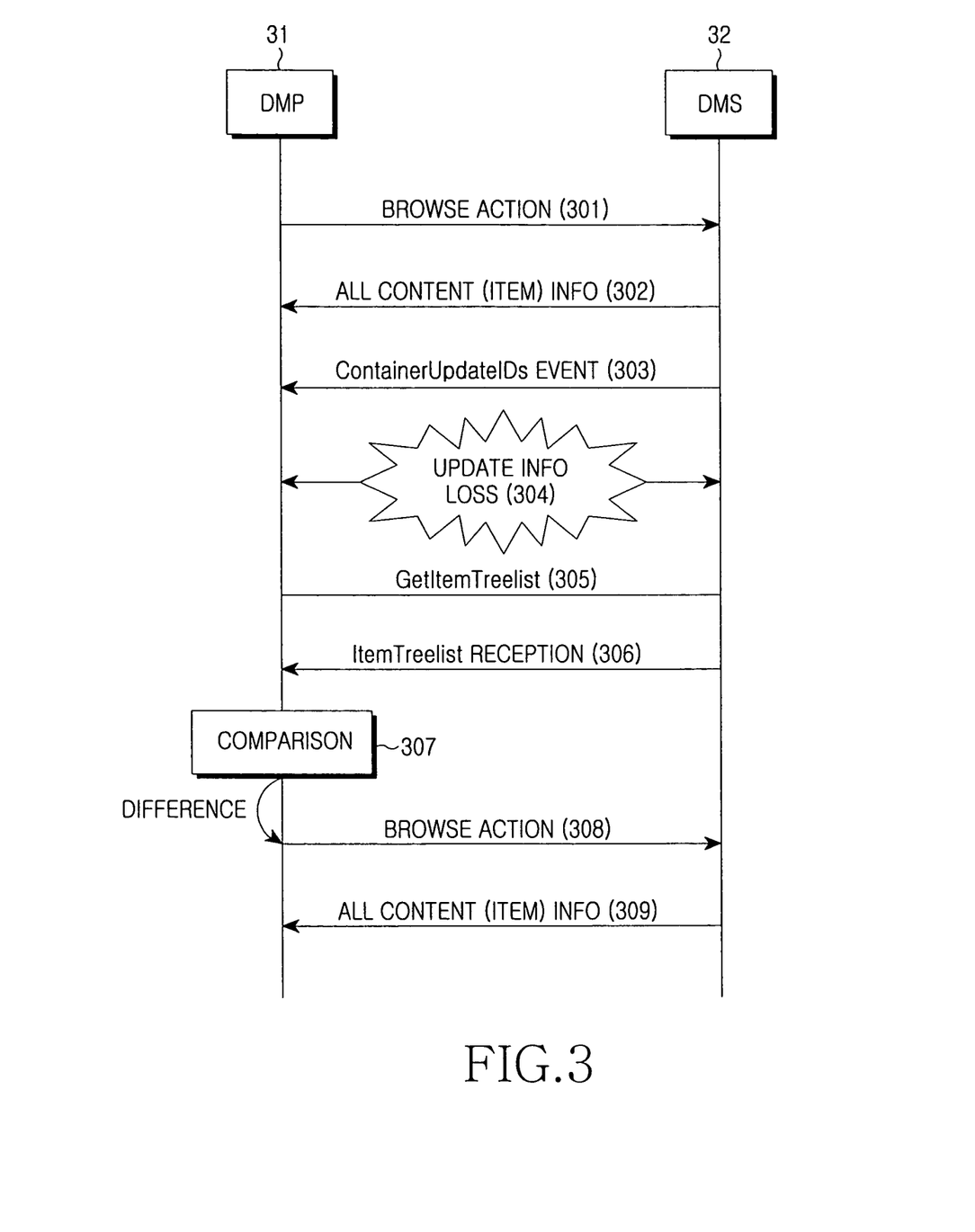
FIG. 3 illustrates a flowchart illustrating a process for updating contents of a DMS in a DLNA system in accordance with a first exemplary embodiment of the present invention.

FIG. 3 illustrates a flowchart illustrating a process for updating contents of the DMS in a DLNA system in accordance with the first preferred embodiment of the present invention.

Referring to FIG. 3, a DMP 31 obtains all information about contents of the DMS 32 through a browse action thereto (Steps 301 and 302).

Through the browse action, a content (or item) list of the DMS 32 is received in XML format. Information received in XML format includes each content ID, item tree-related information such as a parent ID, child count, content title, content class, and content size mapped to the associated content, and detailed information about contents.

The update of content information received from the DMS 32 through the browse action is identified in a "ContainerUpdateIDs" event of "ContentDirectory" (Step 303). In the "ContainerUpdateIDs" event, information about changed items is transferred in a regular period. A regular period is one that occurs regularly with a given period or time between occurrences. However, the basic environment of the DLNA system is based on the IP. Because a sequential packet transmission cannot be guaranteed due to the variable nature of a network environment a reliability problem may result in the "ContainerUpdateIDs" event due to transfer only a part of an updated item between the DMS 32 AND THE DMP 31.

When an associated event is lost in the "ContainerUpdateIDs" event of the prior art DLNA content directory spec, information about contents (or items) can differ between the DMS 32 and the DMP 31, i.e., item information may be wrong.

When accessing the DMS 32 using wrong item information, the DMP 31 must wait for a predetermined time because an item cannot be found. When the DMP 31 accesses a different item, and wrong item information, or wrong contents, a problem in a service occurs. The "ContainerUpdateIDs" event is not an event to be transferred at every update time, but is an event to be transferred periodically. When a content update of the DMS 32 is not transferred in real time, synchronization may not be acquired when the DMP 31 uses a content list.

Thus, the case where update information is lost is taken into account in this first embodiment (Step 304). That is, upon determining that update information has been lost, in a first preferred embodiment the DMP 31 receives "ItemTreeList" through the "GetItemTreeList" action (Steps 305 and 306).

In this case, "ItemTreeList" includes only information about item tree layers and layer-by-layer IDs. In comparison with an amount of all content information received through the conventional browse action, a smaller amount of data is received in the first embodiment of the present invention.

When "ItemTreeList" is received (Step 306), the DMP 31 compares its stored information with only "ItemTreeList" (Step 307), and detects a content information difference between the information stored by the DMP 31 and the information received from the DMS 32 whenever such a difference occurs. If the content information difference is detected, all information about contents of the DMS is obtained through the conventional browse action (Steps 308 and 309).

On the other hand, if the content information difference is not detected, it is determined that a content update is not lost, such that the conventional action "ContainerUpdateIDs" event is then performed (not shown).

Figure 4:
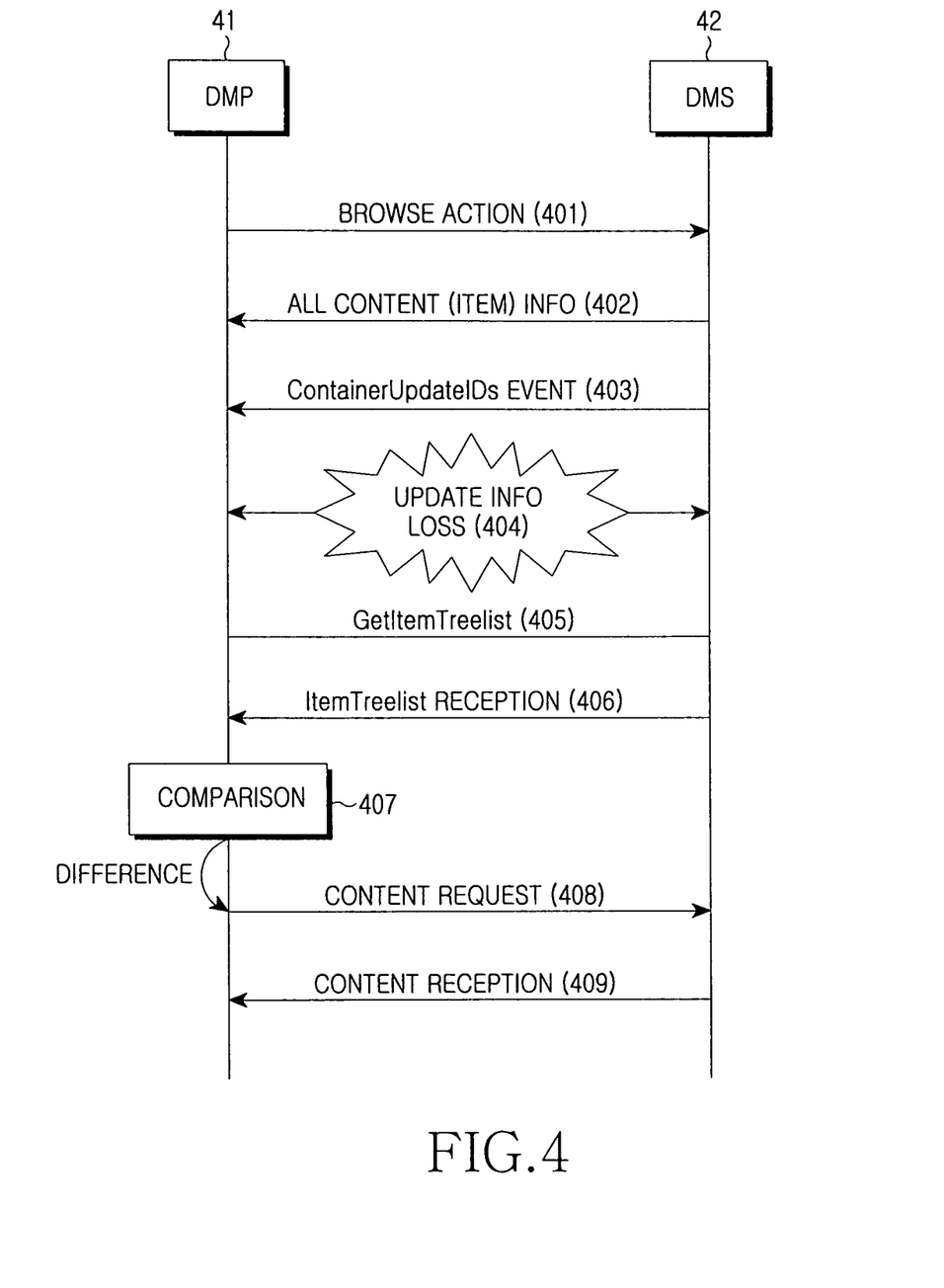
FIG. 4 illustrates a flowchart illustrating a process for updating contents of the DMS in the DLNA system in accordance with a second exemplary embodiment of the present invention.

FIG. 4 is a flowchart illustrating a process for updating contents of the DMS in the DLNA system in accordance with a second preferred embodiment of the present invention.

Referring to FIG. 4, a DMP 41 obtains all information about contents of the DMS 42 through a browse action thereto (Steps 401 and 402).

Through the browse action, a content (or item) list of the DMS 42 is received in XML format. Information received in the XML format includes each content ID, item tree-related information such as a parent ID, child count, content title, content class, and content size mapped to the associated content, and detailed information about contents.

The update of content information received from the DMS 42 through the browse action is identified in a "ContainerUpdateIDs" event of "ContentDirectory" (Step 403). In the "ContainerUpdateIDs" event, information about changed items is transferred in a regular period where a regular period is as defined above for the first preferred embodiment. However, the basic environment of the DLNA system is based on the IP. Because a sequential packet transmission cannot be guaranteed due to the variability of traffic of a network environment, a reliability problem can occur in the "ContainerUpdateIDs" event when transferring only an updated part of an item.

When an associated event is lost in the "ContainerUpdateIDs" event of the prior arat DLNA content directory spec, information about contents (or items) can be different between the DMS 42 and the DMP 41, i.e., the information at the DMP 41 can be wrong.

When accessing the DMS 42 and executing wrong item information, the DMP 41 must wait for a predetermined time because an item cannot be found. When the DMP 41 accesses a different item and wrong information or contents, a problem in a service can occur. The "ContainerUpdateIDs" event is not an event to be transferred at every update time, but is an event to be transferred periodically, i.e., in a regular period as defined above. When a content update of the DMS 42 is not transferred in real time, synchronization may not be acquired when the DMP 41 uses a content list.

Thus, the case where update information is lost is considered (Step 404). That is, in a second preferred embodiment, upon determining that update information has been lost, the DMP 41 receives "ItemTreeList" through the "GetItemTreeList" action (Steps 405 and 406).

In the second preferred embodiment, "ItemTreeList" includes only information about item tree layers and layer-by-layer IDs. In comparison with an amount of all content information received through the conventional browse action, a smaller amount of data is received in the present invention.

When "ItemTreeList" is received (Step 406), the DMP 41 compares its stored information with only "ItemTreeList" (Step 407), and detects a content information difference between the information stored by the DMP 41 and the information received from the DMS 42 whenever such a difference occurs. If the content information difference is detected, content information of the different list (the list corresponding to the received different content information) is requested (Step 408), and the associated information of the different list is obtained (Step 409).

On the other hand, if the difference is not detected, it is determined that a content update is not lost, such that the conventional "ContainerUpdateIDs" event is then performed (not shown).

Figure 5:
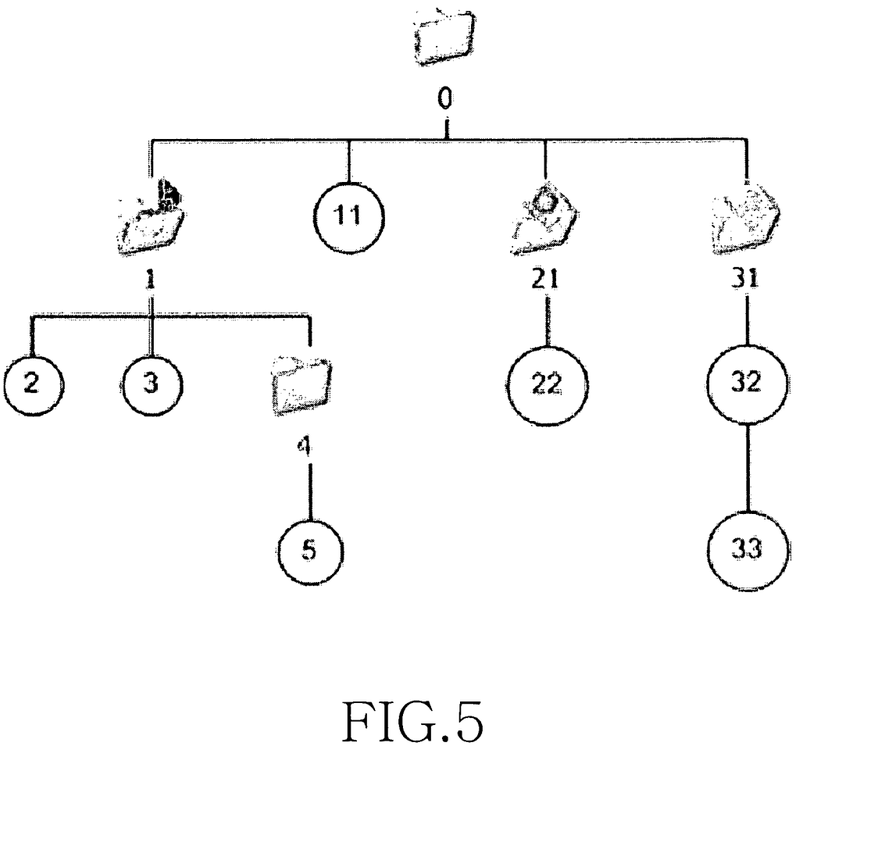
FIG. 5 illustrates an example of a content directory item for generating an "ItemTreeList" state variable used in the process for updating contents of the DMS in the DLNA system in accordance with the present invention.

FIG. 5 illustrates an example of a content directory item for generating an "ItemTreeList" state variable used in the process for updating contents of the DMS in the DLNA system in accordance with the present invention.

A process for generating an "ItemTreeList" state variable through the DMS 32 or 42 will be described with reference to FIG. 5.

In relation to a DMS content directory item of FIG. 5, a container and an item form a tree.

When only tree node IDs and arranged layers are identified because nodes are assigned IDs, a tree structure can be constructed.

"ItemTreeList" corresponding to the state variable defined in all embodiments of the present invention includes node ID numbers in XML format. In accordance with a layer and order of a tag, a layer and order of the tree is identified. Herein, a tree search method is performed from the left to the right of the tree.

In the example illustrated in FIG. 5, nodes are visited in order of IDs, i.e., the nodes are visited in the order 0, 1, 2, 3, 4, 5, 11, 21, 22, 31, 32, and 33. "ItemTreeList" is configured as shown in Example 2. According to each layer, a repeated layer of an XML tag is designated. Along with a tree ID, a container and an item layer is identified in the DMP 31 or 41. The DMP 31 or 41 identifies a content tree.

EXAMPLE 2

```
<Container id=0>
    <Container id=1>
        <Item id=2 />
        <Item id=3 />
        <Container id=4>
            <Item id=5 />
        </Container>
    </Container>
    <Item id=11 />
    <Container id=21>
        <Item id=22 />
    </Container>
    <Container id=31>
        <Container id=32>
            <Item id=33 />
        </Container>
    </Container>
</Container>
```

Example 3 shows a response message to a "GetItemTreeList" action that is transferred with respect to the tree structure as shown in Example 2. A response is made in a SOAP packet. The response information is transferred along with the generated "ItemTreeList" state variable.

EXAMPLE 3

```
HTTP/1.1 200 OK
CONTENT-TYPE: text/xml; charset="utf-8"
<s:Envelope xmlns:s="http://schemas.xmlsoap.org/soap/envelope/"
    s:encodingStyle="http://schemas.xmlsoap.org/soap/encoding/">
    <s:Body>
        <u:GetItemTreeListResponse xmlns:u="urn:schemas-upnp-org:service:serviceType:v">
            <ItemTreeList>
    <Container id=0>
        <Container id=1>
            <Item id=2 />
            <Item id=3 />
            <Container id=4>
                <Item id=5 />
            </Container>
        </Container>
        <Item id=11 />
        <Container id=21>
            <Item id=22 />
        </Container>
        <Container id=31>
            <Container id=32>
                <Item id=33 />
            </Container>
        </Container>
    </Container>
            </ItemTreeList>
        </u:GetItemTreeListResponse>
```

```
</s:Body>
</s:Envelope>
```

As described above, all preferred embodiments of the present invention are implemented with a program and that is stored in a computer readable recoding medium selected from the group consisting of a CD-ROM, RAM, floppy disk, hard disk, and optical magnetic disk.

All preferred embodiments of the present invention continuously update information about contents between a DMP and a DMS without any problem, by defining an action based on a new state variable that obtains a smaller amount of data than a conventional browse action for obtaining detailed information about all items and therefore can more effectively identify all the items in comparison with the conventional "ContainerUpdateIDs" event.

The present invention can provide the most correct content information by defining and maintaining a state variable at a DMP relative to a given DMS that is coupled to the DMP and receiving content information of the given DMS as a state variable when the DMP needs the information and comparing the content information received from the given DMS by the DMP in the form of a state variable with the maintained state variable at the DMP for the given DMS to obtain a comparison result. Whenever the comparison result is a difference, the DMP can take appropriate corrective action. Otherwise, the DMS is continuously updated.

Although the preferred embodiments and the accompanying drawings of the present invention have been disclosed for illustrative purposes, those skilled in the art will appreciate that various modifications, additions, and substitutions are possible, without departing from the scope of the present invention as defined by the appended claims.

What is claimed is:

1. A method for updating contents of a Digital Media Player (DMP) in communication with a Digital Media Server (DMS) in a network having IP connectivity and including a Hypertext Transfer Protocol (HTTP) server and client, comprising the steps of:
   a) performing an update process through a periodic update event in the DMP that receives all content information of the DMS in eXtensible Markup Language (XML) format through a modified browse action in which a state variable is defined relative to the DMS and the state variable obtains a smaller amount of data than by a non-modified browse action;
   b) sending a request for information by the DMP about a list of items possessed by the DMS to the DMS, upon determining that information loss has occurred in the update process;
   c) receiving from the DMS by the DMP information about the list of items and comparing by the DMP the received information about the list of items with information about pre-stored items at the DMP to obtain a comparison result, the list of items including information about item tree layers and layer-by-layer IDs in the form of the state variable with a maintained state variable at the DMP for the given DMS to obtain the comparison result;
   d) obtaining by the DMP all information about contents of the DMS associated with received information indicated to be different in XML format through the browse action when a difference occurs as a comparison result of step c).

2. The method of claim 1, wherein the periodic update event of step a) is a "ContainerUpdateIDs" event.

3. The method of claim 1, wherein the request for the information about the list of items possessed by the DMS in step b) is made by the DMP sending a "GetItemTreeList" action to the DMS.

4. The method of claim 3, wherein the information about the list of items of step c) is received from the DMS by the DMP in an "ItemTreeList".

5. The method of claim 4, wherein identifiers (IDs) of items within an item tree of the DMS are hierarchically stored in the "ItemTreeList" in Extensible Markup Language (XML) format.

6. A non-transitory computer readable medium storing a program configured to execute the method of claim 1.

7. The non-transitory computer readable medium of claim 6, wherein the medium is selected from the group consisting of CD-ROM, RAM, floppy disk, hard disk, and optical magnetic disk.

8. A method for updating contents of a Digital Media Player (DMP) in communication with a Digital Media Server (DMS) in a network having IP connectivity and including a Hypertext Transfer Protocol (HTTP) server and client, comprising the steps of:
   a) performing an update process through a periodic update event in the DMP that receives all content information of the DMS in eXtensible Markup Language (XML) format through a modified browse action in which a state variable is defined relative to the DMS and receiving content information of the DMS when the DMP needs information and in which the state variable obtains a smaller amount of data than by a non-modified browse action;
   b) sending a request for information by the DMP about a list of items possessed by the DMS to the DMS, upon determining that information loss has occurred in the update process;
   c) receiving by the DMP from the DMS the requested information about the list of items and comparing by the DMP the received information about the list of items with information about pre-stored items at the DMP to obtain a comparison result, the list of items including information about item tree layers and layer-by-layer IDs in the form of the state variable with a maintained state variable at the DMP for the given DMS to obtain the comparison result;
   d) requesting by the DMP from the DMS contents of a different list and obtaining information about contents associated with received information indicated to be different from the DMS in XML format, when a difference occurs as a comparison result of step c).

9. The method of claim 8, wherein the periodic update event of step a) is a "ContainerUpdateIDs" event.

10. The method of claim 8, wherein the request for the information about the list of items possessed by the DMS in step b) is made by the DMP using a "GetItemTreeList".

11. The method of claim 10, wherein the information about the list of items of step c) is received from the DMS by the DMP in an "ItemTreeList".

12. The method of claim 11, wherein identifiers (IDs) of items within an item tree of the DMS are hierarchically stored in the "ItemTreeList" in Extensible Markup Language (XML) format.

13. An apparatus for updating contents of a Digital Media Player (DMP) in communication with a Digital Media Server (DMS) in a network having IP connectivity and including a Hypertext Transfer Protocol (HTTP) server and client, comprising:
- a non-transitory computer readable recording medium;
- a state variable stored on said medium used to store a content tree list, including information about item tree layers and layer-by-layer IDs, of the DMS in which the state variable is defined relative to the DMS and receiving content information of the DMS when the DMP needs information and in which the state variable stored on said medium obtains a smaller amount of data via a modified browse action than by a non-modified browse action; and
- a computer executable program stored on said medium to periodically update the DMS whenever the program performs a comparison of the state variable stored in said medium with a state variable describing the contents of the DMS, detects a difference between the state variable stored in said medium and the state variable describing the contents of the DMS and requests information corresponding to the difference of the comparison results to the DMS in the form of the state variable stored on said medium with a maintained state variable at the DMP for the given DMS to obtain the comparison results.

14. The apparatus of claim 13, wherein said state variable is define by an "ItemTreeList".

15. The computer readable medium of claim 14, wherein the medium is selected from the group consisting of CD-ROM, RAM, floppy disk, hard disk, and optical magnetic disk.

16. The computer readable medium of claim 13, wherein the medium is selected from the group consisting of CD-ROM, RAM, floppy disk, hard disk, and optical magnetic disk.

* * * * *

UNITED STATES PATENT AND TRADEMARK OFFICE
CERTIFICATE OF CORRECTION

Page 1 of 1

PATENT NO.        : 8,805,923 B2
APPLICATION NO.   : 11/497835
DATED             : August 12, 2014
INVENTOR(S)       : Kim et al.

It is certified that error appears in the above-identified patent and that said Letters Patent is hereby corrected as shown below:

In the Claims

Column 10, Claim 5, Lines 12-14 should read as follows:
--...format. A non-transitory computer...--

Column 12, Claim 14, Line 8 should read as follows:
--...is defined by an...--

Column 12, Claim 15, Line 9 should read as follows:
--...The apparatus of claim 14...--

Column 12, Claim 16, Line 13 should read as follows:
--...The apparatus of claim 13...--

Signed and Sealed this
Twenty-eighth Day of October, 2014

Michelle K. Lee
*Deputy Director of the United States Patent and Trademark Office*